Feb. 6, 1962 E. A. FERRIS ET AL 3,019,873
SPRAG
Filed April 8, 1957 3 Sheets-Sheet 1
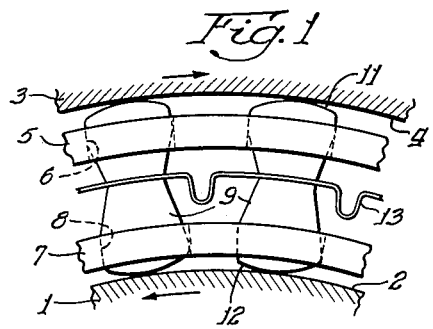
Fig. 1
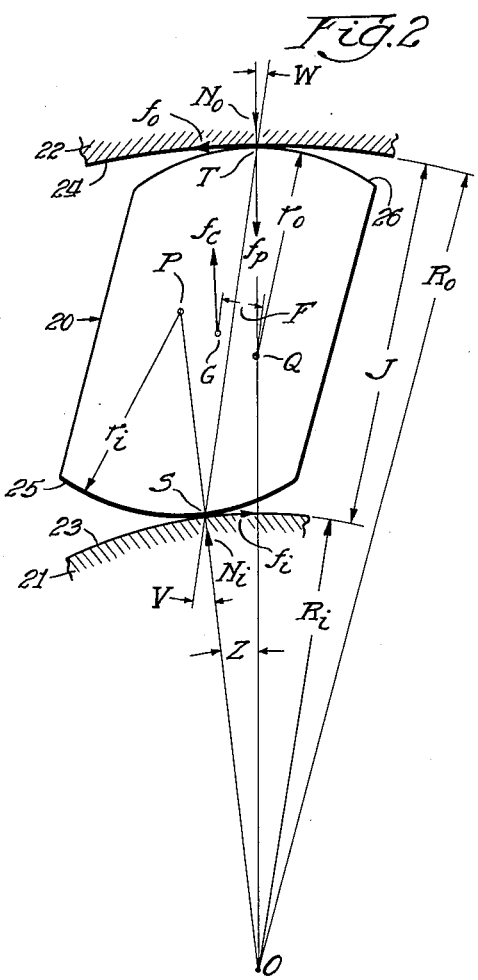
Fig. 2
Fig. 3
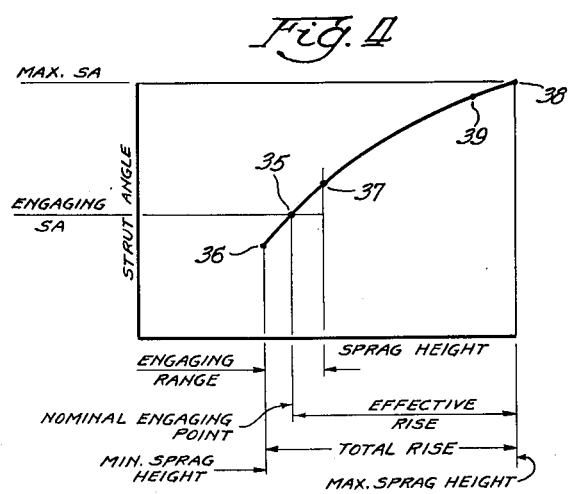
Fig. 4
Inventors:
Ernest A. Ferris
and Robert J. Curran
By: Donald W. Banner Atty.

Feb. 6, 1962 E. A. FERRIS ET AL 3,019,873
SPRAG
Filed April 8, 1957 3 Sheets-Sheet 2
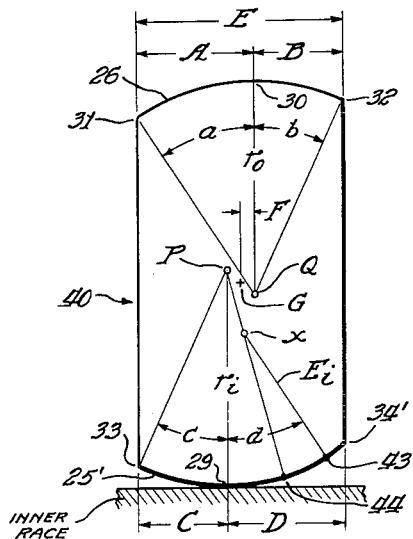
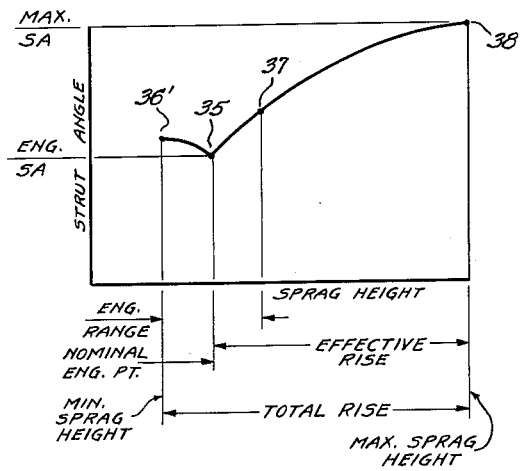
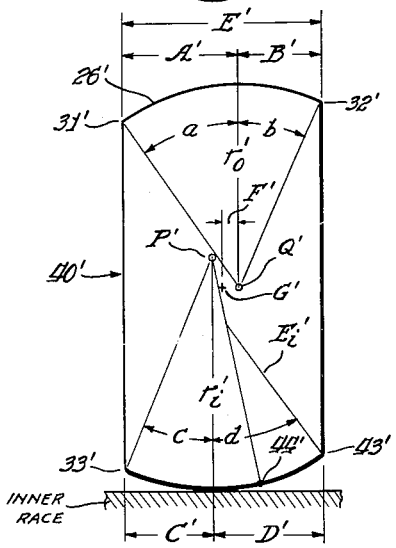
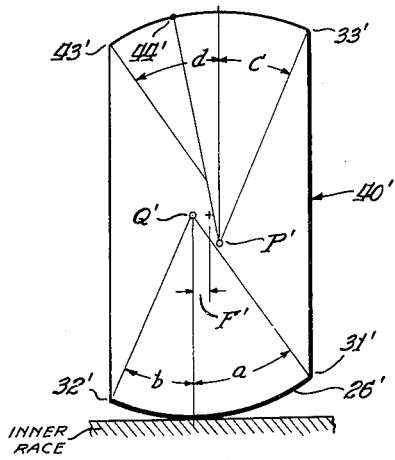
Inventors:
Ernest A. Ferris
and Robert J. Curran
By: Donald W. Banner Atty.

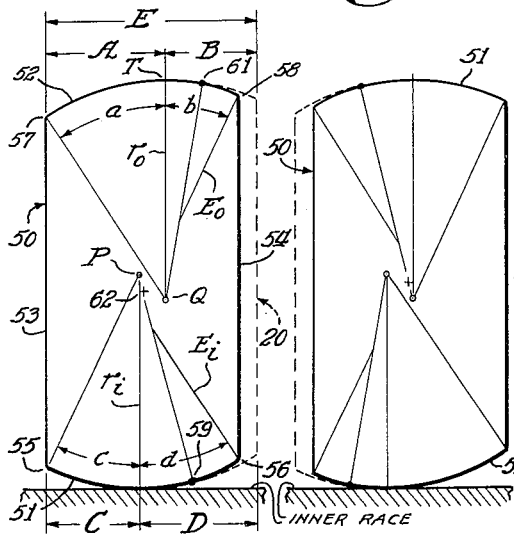
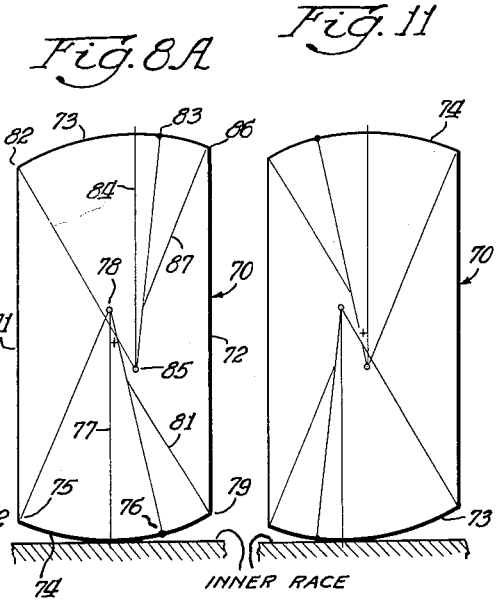

United States Patent Office 3,019,873
Patented Feb. 6, 1962

3,019,873
SPRAG
Ernest A. Ferris, Downers Grove, and Robert J. Curran, Chicago, Ill., assignors to Borg-Warner Corporation, a corporation of Illinois
Filed Apr. 8, 1957, Ser. No. 651,493
12 Claims. (Cl. 192—45.1)

This invention relates to tiltable grippers for one-way clutches capable of transmiting torque in one relative direction of race rotation only.

One-way clutches of the tiltable gripper type are well known in the art and generally comprise a plurality of grippers disposed between inner and outer concentric cylindrical races; cage means may be provided for spacing and/or phasing the grippers; and spring or other resilient means operable to bias the grippers into engagement with the races. Bearing means for maintaining the races in a concentric relationship are provided.

The grippers of the prior art structures generally comprise rigid elements formed with eccentric cylindrical cam surfaces in engagement with the races. The grippers are so disposed between the races that for one direction of relative rotation of the races the grippers tilt over so as to present a minimum radial length between the races and thereby allow a free overrunning of one race with respect to the other. Upon a reversal of relative direction of rotation, the grippers tilt in the opposite direction so as to present a maximum radial length between the races which is greater than the radial distance between the races. The grippers are then effective to lock together the inner and outer races and thereby permit the transmission of torque from one race to the other.

The conventional types of grippers having simple eccentric cylindrical cam surfaces function satisfactorily in most devices utilizing this type of one-way clutch; however, for many applications, because of cost and operating characteristics, the conventional grippers are unsuitable.

The conventional grippers have also been found to be unsatisfactory in some applications due to the fact that when the sprags are rotating with one of the races at high speed, the centrifugal force acting upon the grippers requires that they have specified centrifugal characteristics which usually inherently provides them with certain undesirable characteristics.

It is therefore, an object of the present invention to provide an improved gripper formed with compound cam surfaces, that is, surfaces generated by two or more tangent arcs, and having improved operating characteristics.

It is another object to provide grippers having compound cam surfaces and of relatively narrower width than conventional grippers, thereby permitting the use of an increased number of grippers for a given race size with a corresponding increase in clutch torque capacity.

It is an additional object of the present invention to provide sprags or grippers having compound race engaging surfaces characterized by the provision of a substantially increasing strut angle with a decreasing sprag height over the low sprag height portion of its operating range.

Another object is the provision of an improved compound sprag or gripper characterized by a first major pair of radii defining major portions of the cam surfaces of the sprag and an additional radius which defines a minor portion of one of the cam surfaces, the additional radius being shorter than the major radius which defines the major portion of the one cam surface.

A further object is the provision of a sprag in accordance with the preceding object in which the sum of the length of the additional radius and the opposite major radius is less than the sprag height within its operating tilting range.

It is another object to provide a compound sprag design, the centrifugal action of which can be varied without sacrificing desirable sprag characteristics.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is a fragmentary sectional view of a sprag type one-way clutch;

FIGURE 2 is a side view of a conventional sprag disposed between inner and outer concentric cylindrical races;

FIGURE 3 is an enlarged side view of a conventional sprag illustrating various physical dimensions of the sprag;

FIGURE 4 is a graph of strut angle vs. sprag height for the conventional sprag of FIGURE 3;

FIGURES 5 and 5A are enlarged side views of two forms of improved compound sprags having a single compound cam surface;

FIGURE 6 is a graph of strut angle vs. sprag height for the sprag illustrated in FIGURE 5;

FIGURE 7 is a figure similar to FIGURE 5A, but with the compound surface forming the opposite race engaging surface;

FIGURES 8 and 8A are side views of two further modified sprags incorporating the principles of the present invention;

FIGURE 9 is a graph of strut angle vs. sprag height for the sprag of FIGURE 8, with the conventional strut angle curve superimposed thereon and shown by a broken line;

FIGURE 9A is a graph of strut angle vs. sprag height for the further modified sprag illustrated in FIGURE 8A;

FIGURES 10 and 11 are views generally similar to those in FIGURES 8 and 8A showing respectively modified positionings of sprags incorporating the principles of the present invention;

FIGURE 12 is a view in side elevation of a commercial sprag incorporating the advantages of the diagrammatic sprag illustrated in FIGURE 5.

In FIGURE 1 there is shown a portion of a one-way engaging device which comprises an inner race 1 having a cylindrical outer surface 2, and an outer race 3 having a cylindrical inner surface 4. The surfaces 2 and 4 defining a generally annular opening in which is disposed an outer, cylindrical cage 5 having a plurality of circumferentially spaced openings 6 extending therethrough. There is also provided an inner cylindrical cage 7 have a plurality of circumferentially spaced openings 8 extending therethrough, cages 5 and 7 being rigid and relatively arcuately movable. Extending through the openings 6 and 8 are sprags 9, incorporating the principles of the present invention. Sprags 9 respectively have outer cam surfaces 11 engaging the race surface 4 and inner cam surfaces 12 engaging the race surface 2. Intermediate the cages 5 and 7 is a flexible annular cage 13 having a plurality of circumferentially spaced openings through which generally center portions of the sprags 9 extend, the cage 13 further being provided with integral spring tabs which serve to bias the sprags 9 toward the position in which the cam surfaces 11 and 12 thereon remain in engagement with the race surfaces 4 and 2, respectively. The openings 6 and 8 have straight, flat, circumferentially facing sides; the portions of the sprags which extend through the openings 6 and 8 are formed with circumferentially facing sides constructed to remain in bearing engagement with the adjacent, circumferentially facing opening sides throughout the normal tilting range of the sprags 9.

When the races 1 and 3 are rotated relatively in the (overrunning) direction illustrated by the arrows in FIGURE 1, the sprags 9 occupy their initial position of engagement with the races, the spring tabs on the ribbon 13 biasing sprag surface 11 toward engagement with the race 3 and sprag surface 12 toward engagement with the race 1, these engagements being of a sliding type so that this relative direction of race rotation is permitted. Conversely, when the races 1 and 3 are rotated relatively in the direction opposite to that indicated by the arrows in FIGURE 1, the sprags 9 are tilted in a counterclockwise direction from the position illustrated in FIGURE 1, in which the surfaces 11 and 12 thereon wedgingly couple the races 1 and 3 for unitary rotation. One-way engaging devices of this general type are fully described and claimed in the co-pending application of Harry P. Troendly et al., Serial No. 379,534, now Patent No. 2,824,636.

Referring to FIGURE 2 there is illustrated a conventional sprag 20 of the general type commonly used at the present time disposed between an inner race 21 and an outer race 22. The inner race 21 is formed with an external cylindrical surface 23 generated by a radius $R_i$ about a point O. The outer race 22 is concentric with the inner race 21 and is formed with an internal cylindrical surface 24 generated by a radius $R_o$ about the point O. The sprag 20 is formed with an inner cylindrical cam surface 25 generated by a radius $r_i$ about a point P. The sprag 20 is also formed with an outer cylindrical cam surface 26 generated by a radius $r_o$ about a point Q spaced from point P. The cam surface 25 is in contact with the inner race surface 23 at the point S, and the outer cam surface 26 is in contact with the outer race surface 24 at the point T.

In accordance with well known geometrical principles, the point of tangency, or the point of contact, of two tangent circles lies on a line passing through the centers of the two circles. Therefore, the point S lies on a line joining P and O. Similarly, the point T lies on a line extending through O and Q. A line drawn through the points S and T defines a "line of action" for the sprag 20. The lines PS and ST describe an angle "V" hereinafter called the "strut angle." The lines ST and TO describe an angle "w" called the "outer strut angle," and the lines PO and OQ describe an angle "z." Considering the triangle described by the points OST, since $$z+w+(180°-v)=180°$$

it is apparent that the sum of the angles z and w is equal to the strut angle v. The radial length presented by a sprag between the races is defined as the "sprag height," as indicated at J in FIGURE 2.

It is apparent that the angles described above change in magnitude as the sprags 20 are tilted into various operating positions, designated as the sprag tilting range.

Torque is transmitted from one race to the other through the sprags 20 when they are in an engaged condition between the races 21 and 22. This torque is transmitted by means of a frictional force existing between the surfaces 23 and 25 and between the surfaces 24 and 26. In accordance with well known physical principles, the direction of this frictional force must be parallel to the surfaces at the point of contact of the surfaces. Therefore the frictional force between the surfaces 23 and 25, designated by $f_i$ lies along a tangent to the surfaces 23 and 25 at the point S. Similarly, the frictional force between the surfaces 24 and 26, designated by $f_o$, lies along a tangent to the surfaces 24 and 26 at the point T.

Torque is defined as the vector product of a force times the perpendicular radius between the force and the axis of rotation. The torque applied to the sprags 20 at the point S is thus equal to the product of $f_i$ times $R_i$, and the torque applied at the point T is equal to the product of $f_o$ times $R_o$. Since the sprags 20 are in rotational equilibrium in an engaged condition, the torque applied at S must be equal and opposite to the torque applied at T and since $R_o$ is greater than $R_i$, the force $f_i$ must be greater than $f_o$.

The torque transmitted through the sprag 20 is thus directly related to the frictional forces $f_i$ and $f_o$ existing between the sprag 20 and the races 21 and 22. The frictional forces $f_i$ and $f_o$ are variable quantities and are limited by the co-efficients of friction $u_i$ and $u_o$ between the sprag 20 and the races 21 and 22, respectively, and are directly related to the normal forces $N_i$ and $N_o$ exerted by the races 21 and 22, respectively, upon the sprag 20. The limiting relationships are given by the formulae $f_i=u_i N_i$, and $f_o=u_o N_o$. In most applications, the co-efficients of friction $u_i$ and $u_o$ will be equal if the inner and outer races are of the same material, but for purposes of discussion this condition need not be so. Normally the races and sprags are of hardened steel. The normal force $N_i$, by definition, must lie on the line OP and is applied to the sprag 20 at the point S. Similarly, the normal force $N_o$ lies along the line OQ and is applied to the sprag 20 at the point T. Since the sprag 20 when engaged is in translational as well as rotational equilibrium, the resultant of the forces $N_i$ and $f_i$ must lie along the line of action ST and must be equal and opposite in direction to the resultant of the forces $N_o$ and $f_o$.

In the discussion given above, it was shown that $f_i$ is greater than $f_o$; therefore, $N_o$ must be greater than $N_i$ in order to satisfy the equilibrium conditions. Since the resultant of the frictional force $f_i$ and the normal force $N_i$ lies on the line ST, which is at the angle V from the normal line OP, it is apparent that $$\frac{f_i}{N_i}=\tan V$$

when the equilibrium conditions are satisfied. It is further apparent that the tran V should never be greater than the co-efficient of friction $u_i$; in the event tan V does become greater than the co-efficient of friction $u_i$, the sprag will slip and no longer operate to wedgingly couple the races.

Restating the latter relationship so that $f_i=N_i \tan V$, it is apparent that the frictional force $f_i$ is directly proportional to the normal force $N_i$ and to the tangent of the strut angle V. In order to transmit an increased torque through the sprags 20 $f_i$ must increase, with a corresponding increase in either $N_i$ or tan V or both. However, the strut angle V must not become too large, or the sprag will slip.

Referring to FIGURE 3, there is illustrated the conventional sprag 20 having inner and outer cylindrical cam surfaces 25 and 26 generated by radii $r_i$ and $r_o$, respectively. For purposes of illustration and discussion only, the sprag 20 is shown with parallel sides 27 and 28. Also, the sprag 20 is assumed to be in contact with flat race surfaces at points 29 and 30, respectively. Radii drawn from the points P and Q to the points 29 and 30 respectively are parallel to the sides 27 and 28 and serve to divide the sprag 20 into sections as follows: the dimension "A" designates an outer portion of the sprag 20 including a portion of the cam surface 26 between the side 27 and the radius $r_o$ terminating at the point 30; the dimension "B" designates an outer portion of the sprag 20 and the cam surface 26 between that radius $r_o$ and the side 28; the dimension "C" designates an inner portion of the sprag 20 and cam surface 25 between the side 27 and the radius $r_i$ drawn through the point 29; and dimension "D" designates an inner portion of the sprag 20 and the cam surface 25 between the side 28 and that radius $r_i$.

The points of intersection of the sides 27 and 28 with the cam surface 26 are designated as 31 and 32, respectively. Similarly, the points of intersection between the sides 27 and 28 and the cam surface 25 are designated by the points 33 and 34, respectively. Radii $r_o$ drawn from the point Q through the points 31 and 30 describe an angle "$a$" corresponding to the dimension A; and radii $r_o$ drawn from Q through the points 32 and 30 describe an angle "$b$" corresponding to the dimension B. Similarly, radii $r_i$ drawn from the point P through the points 33 and 29, respectively describe an angle "$c$" corresponding to the dimension C; and radii $r_i$ drawn from the point P through the points 29 and 34 describe an angle "$d$" corresponding to the dimension D. It is to be noted that the dimensions just described are symmetrical with respect to the center of gravity of the sprag 20, designated by the point "G." The overall width of the sprag 20 between the sides 27 and 28 is designated by the dimension "E." The perpendicular distance from the center of gravity "G" to the radius $r_o$ drawn through the point 30 is designated by the dimension "F." From the symmetry of the sprag 20, it is apparent that the dimensions A and D are equal and the corresponding angles $a$ and $d$ are equal. Similarly, the dimensions B and C are equal as are the angles $b$ and $c$.

The conventional sprag 20 illustrated in FIGURE 3 is normally disengaging under the influence of centrifugal force because of the location of its center of gravity G. It is apparent that when the sprag 20 is disposed between cylindrical races, as shown in FIGURE 2, and is rotating with one or the other of the races 21 or 22, a centrifugal force $f_c$ is acting upon the sprag 20 through the point G. This centrifugal force $f_c$ is equal to a centripetal force $f_p$ exerted by the race 22 against the sprag 20 through the point T. The centrifugal and centripetal forces $f_c$ and $f_p$ are not colinear, however, and thus exert a turning couple upon the sprag 20 equal to the product of the centrifugal force $f_c$ times the dimension F. This turning couple acting upon the sprag 20 tends to turn it clockwise as illustrated so as to present a minimum sprag height between the race surfaces 23 and 24 thereby tending to disengage the sprag 20 from the inner race surface 23.

Referring now to FIGURE 4, there is illustrated a graph of strut angle vs. sprag height for the conventional sprag 20 when rotated between flat, parallel races. Point 36 on the graph of FIGURE 4 designates the lowest sprag height obtainable with sprag 20 and corresponds to the condition when the points 31 and 34 contact their respective races. Point 38, conversely, designates the greatest sprag height and strut angle obtainable with sprag 20, and corresponds to the condition in which the points 32 and 33 contact their respective races. Normally sprag 20, when the clutch in which it is disposed is in its overrunning condition, has a strut angle and sprag height corresponding to the range between points 36 and 37 on the graph of FIGURE 4, depending upon race eccentricity, tolerances, sprag wear etc. Point 35 is the mean or nominable engaging point, intermediate the limits of this range. The total rise of which the sprag 20 is thus capable is the range between the points 36 and 38. However, a nominal maximum indicated by the point 39, which is less than 38, is generally established for a particular application. The normal operating range is thus between the points 35 and 39. That portion of the rise between points 35 and 39 permits the sprag to follow the deflection of the races caused by the normal forces.

It is to be noted from the curve that the strut angle for the conventional sprag 20 increases and decreases generally with increasing and decreasing sprag height respectively.

Attention is directed to the portion of the graph illustrated in FIGURE 4 which lies between the points 35 and 36 thereon. It should be noted that the strut angle decreases. One characteristic of sprag cams is that the change in sprag height per degree of sprag rotation varies with the strut angle. As a result, with a low strut angle, the change in sprag height per degree of sprag rotation will be relatively low. In order, therefore, to obtain a "total rise" as shown on FIGURE 4 it is necessary that the sprag be relatively wide and have relatively long arcuate race engaging surfaces so that it may rotate through the requisite number of degrees which will give this "total rise."

Discussing now the sprag of FIGURE 5, the strut angle curve thereof when its cam surfaces engage flat, parallel races is shown in FIGURE 6. Attention is particularly directed to the fact that the strut angle curve between the points 36' and 37 in FIGURE 6 is generally V shaped, having a low point at its nominal engaging point 35 with relatively higher points at 36' and 37 which define the sprag engaging range. It should particularly be noted that as the sprag height decreases between the points 35 and 36', the strut angle increases. In as much as the change in sprag height per degree of sprag rotation varies with the strut angle, it will be apparent that the change in sprag height per degree of its rotation at the lower end of the sprag engaging range (near point 36') will be substantially greater than at the nominal engaging point (point 35). Obviously, therefore, the total rise in sprag height available for any given width of sprag is substantially greater than in the case of sprags having strut angle curves of the type illustrated in FIGURE 4; corresponding greater "total rise" may therefore be achieved with sprags having strut angle curves as illustrated in FIGURE 6 and having a given width than those having an even greater width but which are provided with a construction which gives the strut angle curve illustrated in FIGURE 4. Obviously also this gives rise to the fact that the sprags having a strut angle curve of the type illustrated in FIGURE 6 will give a particular "total rise" for a lesser amount of sprag rotation than was the case with conventional sprags of the type illustrated in FIGURE 3.

A further practical advantage obtained using sprags having strut angle curves of the type illustrated in FIGURE 6 arises from the fact that the foregoing advantages are achieved without sacrificing the ability of the sprag to "grab" the races when they are rotated relatively in such a manner that the clutch should "lock up." More particularly, if the strut angle exceeds the friction angle of the particular material combination involved, the sprags will slip. For initial engagement, the friction angle is that which corresponds to lubricated metal; that is, the sprag slides on an oil film during free wheeling and then must break through the oil film to engage. After engagement is established, the friction angle is that of unlubricated metal. In addition, free wheel wear occurs on the sprags at the same point at which the sprags must begin engagement. Such wear causes the sprag strut angle to increase, therefore making engagement more difficult. Therefore the sprag strut angle, at the point of initial engagement, must be sufficiently low to break through a cold oil film even after a reasonable amount of free wheel wear has occured. After engagement, the strut angle can be raised to the friction angle of the unlubricated material. As illustrated in FIGURE 6, the strut angle curve rises relatively sharply in both increasing and decreasing sprag height directions; this permits utilization of a relatively low engaging strut angle at the point 35, while achieving all of the advantages described above for a rising strut angle between the points 35 and 36'. For example, it has been found that the strut angle at the point 35 should be of the order of 1.9 degrees to 2.6 degrees in a new clutch.

One type of sprag incorporating the advantageous features which give rise to a strut angle curve of the type illustrated in FIGURE 6 is shown in FIGURE 5. In this figure there is illustrated a sprag 40 which is identical with the sprag illustrated in FIGURE 3, with the sole exception of the construction in the lower right hand corner of FIGURE 5. More specifically, the radii $r_o$ and $r_i$ are equal to those of the sprag in FIGURE 3, the dimensions A, B, C, D and E are identical; and the angles $a$, $b$, $c$, $d$ are equal to those of the sprag illustrated in FIGURE 3. As a result, the outer race engaging surface 26 of the sprag 40 is identical with the surface 26 of the sprag 20 shown in FIGURE 3. However, the inner race engaging surface 25' of the sprag 40 differs from the race engaging surface 25 of the sprag 20 illustrated in FIGURE 3. More specifically, when the points 32 and 33 of the sprag 40 engage their associated races, the sprag 40 will be operating on that point of the strut angle curve illustrated in FIGURE 6 which is indicated by the numeral 38. As the sprag is tilted toward a position of lower sprag height, the sprag will follow the strut angle curve of FIGURE 6; when the desired low point 35 on the strut angle curve is reached, the configuration of the cam surface 25' is modified to provide the increasing strut angle with further decrease in sprag height. For example, the point 44 on the race engaging surface 25' of the sprag 40 is in engagement with the inner race when the sprag position is such as to correspond to the point 35 on the strut angle curve of FIGURE 6; tangent to the arc 33—44, there is formed a shorter arc 44—34' generated by a radius $E_1$ which is shorter in length than radius $r_i$. The center X of arc 44—34' will always lie upon a radial line extending from the point P to the tangent point 44. It should be noted that the sum of $r_o$ and $E_1$ is less than any sprag height obtainable with the sprag 40; this provides an increasing strut angle with decreasing sprag height as the surfaces of the sprag 40 generated by these radii engaged the associated races. When the points 31 and 43 of the cam 40 both engage the associated races, the point 36' on the strut angle curve of FIGURE 6 has been attained. It should be noted that the strut angle curves illustrated in FIGURES 4 and 6 are identical between the points 35 and 38; the change in sprag height between the point 35 on FIGURE 6 and the point 36' thereon, however, is substantially greater than the change in sprag height between the points 35 and 36 on FIGURE 4. This permits a substantially increased overall total rise with devices of the type illustrated in FIGURE 5, or any other sprag having a strut angle curve of the type illustrated in FIGURE 6.

It should be noted in FIGURE 5 that the portion of the inner race engaging surface 25' which lies between the points 43 and 34' was not utilized. Thus for a given angular tilting range of the sprag, a lesser sprag width is required at the inner cam than at the outer cam. A desirable object in sprag design is to decrease the sprag width. One characteristic of cams is that the cam centers can be translated with no effect on the strut angle curve, provided certain conditions are met. More specifically, the cam centers must maintain the same relative positions with regard to each other to have no effect on the strut angle curve when they are translated. The sum of the radii forming opposite cams must be unchanged. Therefore, $r_o$ can be decreased as $r_i$ and $E_1$ are increased by a like amount, the resulting sprag having the same strut angle curve as is shown in FIGURE 6. A sprag having this specific construction is illustrated in FIGURE 5A. In FIGURE 5A there is illustrated a sprag 40'; the angles $a$, $b$, $c$ and $d$ are equal to the correspondingly marked angles of the sprag illustrated in FIGURE 5. As a result the sprag 40' has the same overall tilting range as the sprag 40. However, the radius defining the outer race engaging surface 26' has been shortened in comparison with the corresponding radius of the sprag 40 in FIGURE 5, and so that the length of arc 31'—32' (and the dimensions A', B' and E') is reduced in proportion to the decrease in the length of the radius defining this outer race engaging surface. The radius defining the major portion of the inner race engaging surface of the sprag 40', that is to say, that portion between the points 33' and 44', has been increased in length by an amount such as the sum of the length of this radius and the length of the radius defining the outer race engaging surface is equal to the sum of the radii $r_1$ and $r_o$ in FIGURE 5. In addition, the length of the radius defining the minor portion of the inner race engaging surface of the sprag 40', that is to say that portion between the points 43' and 44', has been increased in length an amount such that the sum of the length of this radius and the radius defining the outer race engaging surface of the sprag 40' is equal to the sum of $E_1$ and $r_o$ in FIGURE 5. With the construction illustrated in FIGURE 5A, when the points 31' and 43' are engaged with their respective races, the point 36' on the strut angle curve illustrated in FIGURE 6 will be attained by the sprag; when the point 44' and the corresponding portion of the surface 26' are in engagement with their respective races, the point 35 on the strut angle curve of FIGURE 6 will be attained; when the points 32' and 33' engage their respective races, the point 38 on the strut angle curve of FIGURE 6 will be attained. As will be readily apparent from the foregoing description, an efficient utilization of all of the cam surfaces on the sprag 40' is obtained. In order to accomplish this advantageous result, the length of the radii forming the cam surfaces on the sprag 40' must be related so that the width of the effective cam surfaces at the top and bottom of the sprag are equal. This will give the most efficient use of metal in the sprag formation. More specifically, as the sprag 40 in FIGURE 5 has a narrow effective width 33—43 on the inner contact surface and a wide effective width 31—32 on the outer contact surface, the sprag width E was of necessity large and the inner contact surface 43—34' was not utilized. By making the outer radius $r_o'$ smaller than $r_o$ as shown in FIGURE 5A, the effective outer cam surface 31'—32' became narrow than cam surface 31—32. Also, by making the inner contact radii $r_o'$ and $E_1'$ larger, than $r_1$ and $E_1$, the effective width 33'—43' became larger than 33—43. Through the proper choice of radii, the inner and outer contact surfaces were made equal. The sprag width E' in FIGURE 5A, while greater than the chord of arc 33—43 in FIGURE 5, is less than the chord of arc 31—32 in FIGURE 5. Therefore, width E' in FIGURE 5A is less than E in FIGURE 5 and FIGURE 3. Thus sprag 40', in FIGURE 5A, has the advantages of being narrower than sprag 20 of FIGURE 3, while providing more total sprag rise than obtainable with sprag 20.

Attention is particularly called to the fact that in FIGURE 5A the distance between the center of gravity G' and the center about which the outer cam surface 26' is generated, designated by the dimension F', is substantially greater than the distance between the center of gravity G of sprag 40 of FIGURE 5 and the center about which the outer race engaging surface 26 is generated. As a result, while sprag 40 of FIGURE 5 is a disengaging sprag under the effect of centrifugal force, the sprag of FIGURE 5A is substantially more disengaging. As a result the sprag 40' of FIGURE 5a will "lift off" the inner race at a speed which is substantially lower than the speed at which the sprag 40 of FIGURE 5 will "lift off" of its inner race.

Attention is now directed to FIGURE 7 in which also shows the sprag 40', this showing however being of that sprag rotated 180° from the position in which it appears in FIGURE 5A. As will be readily apparent to those skilled in the art when the sprag 40' is utilized in a one-way engaging device in this relationship in which the surface 26' engages the inner race, the sprag 40' is substantially centrifugally neutral when point 44' and a portion of this engaging surface 26' respectively engage the associated races. This corresponds to point 35 on the strut angle curve illustrated in FIGURE 6, and this is the point at which the one-way engaging device normally would be so designed that the sprags initially engage at this point. It is particularly important to note that sprag 40' whether employed with the race engaging surface 26' in engagement with either the outer race, as shown in FIGURE 5A, or with the inner race, as shown in FIGURE 7, the strut angle curve illustrated in FIGURE 6 will be applicable.

Attention is now directed to FIGURE 8, in which a sprag 50 is illustrated which has the strut angle curve, when disposed between the flat races, which is illustrated in FIGURE 9. The sprag 50 has an inner race engaging surface 51, an outer race engaging surface 52, and flat sides 53 and 54. The sides 53 and 54 respectively meet the lower race engaging surface 51 at points 55 and 56; these sides engage the outer race engaging surface 52 at the points 57 and 58 respectively. The major portion of the inner race engaging surface 51, that is to say the portion between the point 55 and the point 59, is defined by radius $r_i$, centered at a point P. The portion of inner race engaging surface 51 between points 59 and 56 comprises a minor arc defined by a radius $E_i$ having a center at a point located upon a line extending between the point P and the point 59. The major portion of the outer race engaging surface 52, that is to say that portion thereof between the point 57 and a point 61 is defined by a radius $r_o$, equal in length to $r_i$, and swung about a point Q laterally and vertically offset from the point P. That portion of the outer race engaging surface 52 which lies between the point 61 and the point 58 is defined by a radius $E_o$, swung about a point which lies upon a line extending from the point Q to the point 61. The sum of the lengths of $E_i$ and $r_o$ must be less than any sprag height obtainable; the sum of $E_o$ and $r_i$ must be less than the sprag height in that portion of the tilting range of the sprag 50 in which the arcuate surface between the points 61 and 58 on the race engaging surface 52 is in engagement with the associated race.

For the purposes of comparison, the outline of sprag 20 illustrated in FIGURE 3 has been superimposed upon the sprag 50 in FIGURE 8 and is shown in dotted outline. The radii $r_o$, $r_i$ and the angles a, b, c, and d are identical with those of FIGURE 3. The dimension A and C in both the sprag 50 and 20 are the same, but the overall width of the sprag 50 manifestly is substantially less than that of the sprag 20. It will be seen that the sprags 50 and 20 are identical over the upper portions thereof to the left of point 61 and in the lower portion to the left of point 59. It will also be apparent that in as much as a substantial amount of material has been removed from the right side of the sprag 50, in the view of FIGURE 8, as compared with the sprag 20, the center of gravity indicated by the numeral 62 is substantially to the left of the position of the center of gravity in the sprag 20. As a result, the sprag 50 is substantially greater in its tendency to disengage the inner race under the effect of centrifugal force than the sprag 20.

In FIGURE 9 there is illustrated the strut angle curve with the sprag 50, and superimposed thereon on dotted lines is the strut angle curve for the sprag 20, which lies between the points 36 and 38. In FIGURE 9 the point 63 corresponds to the position to which the points 56 and 57 on the sprag 50 engage their respective races; the point 64 indicates the condition at which the point 59 on the inner race engaging surface 51 engages the associated race, and this corresponds to the point 35 on the strut angle curve for the sprag 20; the point 65 on the strut angle curve of FIGURE 9 illustrates the condition in which the point 61 on the outer race engaging surface 52 is in engagement with its associated race; and the point 66 on the strut angle curve of FIGURE 9 illustrates the condition in which the points 55 and 58 are in engagement with their associated races. It will be seen that while the use of the radius $E_o$ of FIGURE 8 has resulted in a substantially narrower sprag than that illustrated in FIGURE 3, the strut angle curve between the points 65 and 66 for the sprag 50 of FIGURE 8 decreases with increasing sprag height and as a result the maximum sprag height is less than that obtained with the sprag 20 but the overall total rise available with the sprag 50 is greater than that of the sprag 20. In addition, the sprag 50 presents a substantially greater tendency to disengage the inner race under the effects of centrifugal force. It should be noted that the radius $E_i$ when extending from its center of curvature to the point 56 is parallel to the radius $r_o$ between the point Q and the point 57; in addition the radius $E_o$ through its center of curvature and the point 58 is parallel to the radius $r_i$ through the point P and the point 55; as a result of these relationships the entire inner cam surface 51 and outer cam surface 52 will be utilized in the tilting range of the sprag 50.

As previously indicated, the greater the strut angle, the greater the increase or decrease in sprag height per degree of sprag rotation. Considering FIGURE 9, if the increase in strut angle for increasing sprag height between the points 64 and 65 was more rapid, and in the event that, for increasing sprag height, that strut angle curve between points 65 and 66 was maintained essentially constant it will be apparent that the overall total rise obtainable would be greater than that obtainable with the strut angle curve illustrated in FIGURE 9. Preferably, such a strut angle curve should have the characteristics illustrated in FIGURE 9A. In this FIGURE 9A in solid lines there is illustrated the desirable strut angle curve having the aforementioned characteristics and superimposed thereon in dotted lines is the conventional strut angle curve for the sprags of the type illustrated in FIGURE 3. A sprag which would produce such a desirable strut angle curve is illustrated in FIGURE 8A; this sprag, indicated in general by the numeral 70, has the same width as the sprag 50 and is defined by sides 71 and 72, sprag 70 having an outer race engaging surface 73 and an inner race engaging surface 74. That portion of surface 74 between points 75 and 76 thereon is defined by a radius 77 swung about a point 78, the radius 77 being increased in length as compared to the radius $r_i$ of the sprag 50. Tangent to the arc 75—76 is an arc 76—79 defined by a radius 81 swung about a point on a line extending between the points 76 and 78, shorter than the radius $E_i$ of the sprag 50. The outer race engaging surface 73 of the sprag 70 has a major portion thereof, between the points 82 and 83 thereon, generated by a radius 84 swung about a point 85 spaced laterally and vertically from the point 78 to a greater degree than the point Q of sprag 50 as compared to the point P of that sprag. As a result, the radius 84 will be longer than the radius $r_o$ of the sprag 50. A minor portion of the race engaging surface 73—that is between the points 83 and 86—comprises an arc tangent to the arc 82—83 and generated by a radius 87 swung about a point lying upon a line between the points 85 and 83. The length of radius 87 plus the length of radius 77 should be equal to the maximum obtainable sprag height for the sprag 70, obtained when the points 75 and 86 are in contact with their respective races. This will correspond to the point 66′ on the FIGURE 9A. It should be noted that this point corresponds to a greater maximum sprag height than achieved with the conventional sprag of FIGURE 3, the maximum sprag height of which is indicated by the numeral 38 on the FIGURE 9A. The point 65′ on the FIGURE 9A corresponds to the position in which the point 83 on the surface 73 engages the associated race; point 64′ on the FIGURE 9A indicates the position at which the point 76 on the surface 74 contacts the inner race, and the point 63′ corresponds to the position of minimum sprag height in which the points 79 and 82 are in engagement with the inner and outer races respectively. As previously indicated, sprags so constructed provide a substantially increased total rise; in addition, the highest possible strut angle which will give an operative sprag not subject to slipping is rapidly attained; due to the higher strut angle over a substantial portion of the angular tilting range the normal forces on the races are decreased over that experienced with the conventional sprag inasmuch, as previously indicated, the normal forces on the races are inversely proportional to the tangent of the strut angle. In addition, inasmuch as the sprag 70 has the same width as the sprag 50 of FIGURE 8, it is obviously substantially narrower than the conventional sprag 20 which provides for very effective utilization of metal. In addition, narrower sprags permit the utilization of a greater number of these elements in the circumferential opening between the races, so that the torque capacity of the clutch is increased.

In FIGURE 8, the sprag 50 is a heavily disengagable sprag, in which the race engaging surface 51 thereon will lift off the associated inner race at a relatively low r.p.m. In FIGURE 10, there is illustrated the same sprag 50 as shown in FIGURE 8, but rotated 180 degrees from the position of FIGURE 8. While the strut angle curve for the sprag will obviously be identical with that of the same sprag in the position of FIGURE 8, in the position of FIGURE 10 this sprag is substantially centrifugally neutral.

FIGURE 11 illustrates the sprag 70 of FIGURE 8A rotated 180 degrees from the position of the FIGURE 8A. In this rotated position the surface 73 thereon engages the inner race, while the surface 74 engages the outer race. The strut angle curve for this sprag is that shown in FIGURE 9A, but the sprag when oriented as in FIGURE 11 will be substantially centrifugally neutral.

In FIGURE 12 there is illustrated one form of commercial sprag constructed in accordance with the present invention. This sprag will have a strut angle curve illustrated in FIGURE 6. As specific examples only of constructural details of this sprag, its overall width, corresponding to the dimension E in FIGURE 5, may be of the order of 0.1935 to 0.1955 inch. Its overall height H may be of the order of 0.3315 to 0.3325 inch. The point Q may be spaced inwardly from the point 33 by an amount of 0.095 to 0.097 inch, and the radius $r_0$ may be of the order of 0.178 to 0.180 inch. The point P may be spaced to the left of point Q in FIGURE 12 an amount equal to 0.0195 to 0.0205 inch, and the radius $r_1$ may be equal to the radius $r_0$. The point X about which the minor radius $E_1$ is rotated may be 0.0127 inch to the right of point P and 0.0473 inch below point P, in the view of FIGURE 12. The radius $E_1$ may be of the order of 0.129 to 0.131 inch; the point 44, at which the major cam surface 33—44 is tangent to the minor cam surface 44—34', may be spaced inwardly from the point 34' 0.0717 inch so that an angle of 14 degrees to 16 degrees is formed between a vertical line through the point P and a line through the points P, X and 44.

As indicated above, the sprag of FIGURE 12 will have a strut angle curve of the general characteristics shown in FIGURE 6. With such a sprag, for example, the point 38 in FIGURE 6 may correspond to a strut angle of 4¾ degrees and a sprag height of 0.341 inch; the point 35 may correspond to a strut angle of 2¼ degrees and a sprag height of 0.3279 inch; and the point 36' may correspond to a strut angle of 3 degrees and a sprag height of 0.324 inch. It will therefore be seen that as the sprag of FIGURE 12 is tilted toward its disengaging position from point 35 of FIGURE 6 to point 36' thereon, the strut angle will increase about 33⅓% for a sprag height decrease of only about 1.22%.

In summary, the present invention provides tiltable grippers for one-way engaging devices which have a low strut angle at their nominal engaging point to permit them to "grab" the races and lock up the devices despite the lubricant film, but also provided with an increasing strut angle as the gripper is tilted either clockwise or counterclockwise from this nominal engaging point. As previously indicated, the rate of change of sprag height per degree of sprag tilt is proportional to the strut angle. If the grippers, therefore, are tilted toward their engaged position from this point of low strut angle, the strut angle will increase giving increasing amounts of sprag rise per degree of sprag rotation, and progressively decreasing the normal forces on the races. Similarly, if the grippers are tilted toward their disengaged position from this point of low strut angle, the strut angle will also increase providing a relatively rapid decrease in sprag height per degree of sprag rotation; as a result, any particular minimum value of sprag height may be attained with less sprag rotation than heretofore possible and also provides for a lower minimum sprag height for a sprag of any given width. This, obviously, advantageously also permits the utilization of narrower sprags than heretofore possible in many applications with the attendant advantages discussed earlier. Furthermore, the present invention provides tiltable grippers having what is, in effect, variable centrifugal characteristics while retaining the identical dimensions and strut angle curves. All of these advantages may be provided utilizing only three radii in the formation of the sprag, two major arc determining radii and one minor arc determining radius. Inasmuch as tiltable grippers generally are rather short, this is an extremely important feature which facilitates the manufacture of the grippers. It should also be noted that the overall wider engaging range possible with devices constructed in accordance with the present invention makes dimensional control in the clutches and bearings associated therewith less critical.

If it is desired to achieve additional advantages, both cam surfaces of the grippers may be formed by two tangent radii, (or one cam surface may have a central portion defined by a relatively long major radius and end portions each defined by a radius shorter than the major radius) instead of only the one cam surface discussed in the previous paragraph. As discussed with regard to FIGURE 9A, a strut angle curve thereby results which has three different portions as illustrated in that figure. This provides the added advantage of making the overall strut angle curve as high as possible, and further increasing the total sprag rise.

While certain preferred embodiments have been specifically disclosed, it is understood that the invention is not limited thereto, as many variations will be readily apparent to those skilled in the art and the invention is to be given its broadest possible interpretation within the terms of the following claims.

We claim:

1. A gripper for a one-way engaging device comprising a first surface adapted to engage a race, a second surface spaced from said first surface adapted to engage another race, one of said surfaces being defined by a first radius and a second radius shorter than said first radius, the portion of said one surface defined by said first radius being longer than the portion thereof defined by said second radius.

2. A sprag for a one-way engaging device comprising a first surface adapted to engage a race having a major portion thereof generated by a first radius, a second surface adapted to engage another race spaced from said first surface, said second surface having a major portion defined by a second radius and a minor portion thereof shorter than said major portion thereof defined by a third radius shorter than said second radius, said first and third radii being characterized in that the sum of the lengths thereof is less than the sprag height over the region in which the surfaces defined by said first and third radii respectively simultaneously engage the race surfaces.

3. The sprag defined in claim 2, in which said major portion of said second surface is adapted to engage the associated race when the sprag presents its greatest sprag height, and the minor portion is tangent to said major portion and extends over that portion of the sprag second surface which is adapted to engage the associated race when the sprag height is at a minimum.

4. A sprag for a one-way engaging device characterized by two surfaces respectively at spaced portions thereof adapted for race engagement, each of said surfaces comprising two tangent arcuate portions of unequal length, each portion of greater length being generated by a first radius, and each portion of lesser length being generated by a second radius shorter than the adjacent first radius, the sum of the lengths of one first radius and that second radius which defines the race engaging surface spaced from that defined by said one radius is less than the sprag height of the sprag.

5. A sprag as defined in claim 4, in which the sum of the other first and second radii is substantially equal to the sprag height over at least a portion of the region in which the race engaging surfaces defined by these other two radii are respectively in engagement with the races simultaneously.

6. A sprag for a one-way engaging device comprising a first arcuate surface adapted to engage a race including a portion of major extent generated by a first radius rotated about a first center within the sprag, a second arcuate surface adapted to engage a race including a portion of major extent generated by a second radius rotated about a second center within the sprag spaced longitudinally and vertically from said first center when the sprag is vertical, said first surface including an arcuate portion of minor extent tangent to said major portion thereof and generated by a third radius shorter than said first radius rotated about a third center within the sprag spaced from said first and second centers lying upon a line extending through said first center and the point of tangency of said major and minor portions of said first surface, said third radius and third center being disposed as to form said minor arcuate portion in that region of said first surface which is adapted to engage a race when the sprag height is relatively low.

7. A sprag as defined in claim 6 in which the sum of the lengths of said second and third radii is less than the sprag height.

8. A sprag as defined in claim 6 in which one of said surfaces includes a second arcuate portion of minor extent tangent to said major portion on said one surface generated by a fourth radius shorter than the radius which generates said major portion on said one surface rotated about a fourth center within the sprag lying upon a line extending through the center of rotation of the radius which generates said major portion on said one surface and the point of tangency of said major portion and said second arcuate portion on said one surface, said fourth radius and fourth center being disposed as to form said second portion of minor extent in that region of said one surface which is adapted to engage a race when the sprag height is relatively high.

9. A sprag as defined in claim 6 in which the sum of the lengths of said second and third radii is less than the sprag height, and in which the sum of the lengths of said fourth radius and the radius which defines the major portion of the other of said surfaces is substantially equal to the maximum sprag height.

10. A sprag for a one-way engaging device tiltable through an operating range comprising a first surface adapted to engage an inner race, a second surface adapted to engage an outer race concentric with said inner race, first means defining said first surface, second means defining said second surface, said first and second means characterized by cooperatively defining a sprag with a strut angle curve when the sprag is tilted through its operating range which has a relatively low strut angle near the minimum sprag height, a first strut angle at the minimum sprag height greater than the strut angle near the minimum sprag height, and a strut angle at the maximum sprag height greater than the strut angle near the minimum sprag height.

11. A sprag for a one-way engaging device tiltable through an operating range comprising a first surface adapted to engage an inner race, a second surface adapted to engage an outer race concentric with said inner race, first means defining said first surface, second means defining said second surface, said first and second means characterized by cooperatively defining a sprag with a strut angle curve when the sprag engages flat parallel races and is tilted through its operating range which has a strut angle of the order of 1.8 to 2.6 degrees near the minimum sprag height, a strut angle at the minimum sprag height greater than the strut angle near the minimum sprag height, and a strut angle at the maximum sprag height greater than the strut angle near the minimum sprag height.

12. The sprag defined in claim 11 in which the strut angle at the minimum sprag height is of the order of 2.6 to 3.4 degrees, and in which the strut angle at the maximum sprag height is of the order of 4.4 to 5 degrees.

References Cited in the file of this patent

UNITED STATES PATENTS

| | | |
|---|---|---|
| 2,597,241 | Gruenberg et al. | May 20, 1952 |
| 2,827,992 | Hein | Mar. 25, 1958 |